United States Patent [19]

Villadsen

[11] 4,193,894

[45] Mar. 18, 1980

[54] CATALYST FOR OXIDATION OF SULFUR DIOXIDE

[75] Inventor: John Villadsen, Vedbek, Denmark

[73] Assignee: Monsanto Company, St. Louis, Mo.

[21] Appl. No.: 2,648

[22] Filed: Jan. 11, 1979

[51] Int. Cl.$^2$ .................... B01J 27/02; C01B 17/68
[52] U.S. Cl. ............................ 252/440; 252/456; 423/535
[58] Field of Search .............. 252/440, 456, 451; 423/535

[56] References Cited

U.S. PATENT DOCUMENTS

| | | | |
|---|---|---|---|
| 1,420,203 | 6/1922 | MacDowell et al. | 423/535 |
| 3,789,019 | 1/1974 | Stiles | 252/440 |
| 3,987,153 | 10/1976 | Stiles | 423/535 X |

FOREIGN PATENT DOCUMENTS

| | | | |
|---|---|---|---|
| 345557 | 3/1931 | United Kingdom | 423/535 |
| 432916 | 12/1974 | U.S.S.R. | |

OTHER PUBLICATIONS

"The Promoting Action of Group I Elements and of Lanthanides on Vanadium Catalysts," Brodovich et al., Vanadievyi Katal. dlya Kontaktn. Priovz Sernoi Kisloty Nauch. Issled. Inst. Udobr. i Insektofung. Sb. Statei, 1963, pp. 85–89.

"The Role of Alkali Sulphates in Vanadium Catalysts for Sulphur Dioxide Oxidation," Tandy, G. H., J. Appl. Chem., 6, Feb. 1956, pp. 68–74.

"The Influence of Alkali Metal Sulfates on the Activity of Vanadium Pentoxide in the Catalytic Oxidation of Sulfur Dioxide, Pavel Jiru, Vanadieviye Katal. dlya Kontaktn. Prizv. Kisloty, Nauch. Issled. Inst. Udobr. iInsektofung, Sb. Statei, 1963, pp. 21–35.

*Primary Examiner*—Carl F. Dees
*Attorney, Agent, or Firm*—Arthur E. Hoffman

[57] ABSTRACT

A catalytic material for oxidation of sulfur dioxide to sulfur trioxide at any temperature above 300° C., comprising a catalyst which at reaction conditions is a melt including sulfatized vanadium ions as the active catalytic component and two different promoters and which is dispersed in an inert porous carrier.

The first promoter comprises cesium ions, optionally in combination with ions of another alkali metal such as sodium, potassium or rubidium, known to promote vanadium catalysts. The second promoter comprises ions of a metal such as aluminum, magnesium, yttrium or lanthanum, which does not promote formation of inactive $V^4$ species and the oxide of which has a heat of formation greater than 100 kcal per oxygen atom and is at least partly soluble in the heavily sulfatized environment of the melt.

25 Claims, No Drawings

CATALYST FOR OXIDATION OF SULFUR DIOXIDE

BACKGROUND OF THE INVENTION

Conversion of sulfur dioxide to sulfur trioxide in an air mixture containing 7 to 10 vol % of $SO_2$ to a degree of conversion of approximately 97 to 98% can easily be achieved by means of a number of commercially available vanadium catalysts promoted by postassium, sodium or mixtures of these alkali metals. Environmental protection laws in a number of industrialized countries require, however, that the off-gases leaving a sulfuric acid plant contain considerably less unconverted $SO_2$ than corresponding to 97 to 98% conversion of a feed gas with 7 to 10 vol % $SO_2$.

Hence, the prior art describes a number of procedures by which 99.5 to 99.7% conversion is obtained. Absorption of $SO_3$ before the final pass of a converter chain is one well known design solution by which the thermodynamic equilibrium conditions can be made sufficiently favorable for attainment of 99.7% conversion of the original feed gas even though the lowest practicable operation temperature for the catalyst is usually said to be approximately 420° C. Operation at elevated pressure with recirculation of off-gases from the last bed to the fresh-air drying towers can also, at least in principle remove all remaining $SO_2$ by absorption in the sulfuric acid used as drying agent in these units.

The $SO_2$ concentration in the off-gases can also be lowered by physical processes e.g. by adsorption on a dry sorbent or chemically by reduction of $SO_2$ to elemental sulfur or by oxidation to $SO_3$ using a solution of hydrogen peroxide in sulfuric acid.

The various double absorption plant designs and the process by which off-gases are recirculated are complicated and energy consuming compared to a straight through process. The use of a chemical such as $H_2O_2$ to remove $SO_2$ from the off-gases results in higher production costs of the sulfuric acid produced.

The ideal process would be one by which sufficiently high conversion (e.g. 99.7%) is obtained by a straight through conventional multipass conversion in a single absorption process using, for example, 4 to 5 catalyst passes.

In order to reduce the $SO_2$ content of the off-gases to approximately 500 ppm, i.e. to attain a 99.5% conversion of a feed gas with 10 vol % $SO_2$, in a process operating at substantially atmospheric pressure and without removal of $SO_3$ by inter-pass absorption, the temperature of the gas leaving the final pass must not exceed 380° to 385° C. and is preferably 370° C. or lower. This in turn requires that the inner temperature of the gas entering the final pass must not be higher than 370° to 380° C. and is preferably 365° C. or lower.

The commonly used potassium promoted vanadium catalysts with K/V atomic ratios of 2.5:1 to 3.5:1, however, do not permit operation at these low temperatures. The reason for the dramatic decrease of activity of K (or Na) promoted catalysts below 415°–420° C. is discussed by Villadsen and Livbjerg (Catal. Rev.-Sci. Eng. 17(2) 203 (1978)). They reason that a certain inactive $V^4$ species may precipitate from the catalytic melt at low temperature, thus rupturing the catalytic cycle $V^5 \rightarrow V^4 \rightarrow V^5$ by which oxygen is transferred to $SO_2$ to form $SO_3$. Example 1 of this application shows the typical behaviour of a K promoted catalyst below 420° C., and the results of this example may directly be compared to the results of the following examples 2, 3, and 4 where a catalyst identical to that of example 1 except that Cs is used instead of K, is shown to have high activity at a reaction temperature 70°–80° C. lower than the K promoted catalyst.

The ability of Cs to retain the activity of a V based $SO_2$ oxidation catalyst at low temperature has been claimed in several patents starting with U.S. Pat. No. 1,941,426 by Beardsley et al (dated Dec. 26, 1933). This ability is postulated in a number of publications quoted in the above mentioned review by Villadsen and Livbjerg, further in a handbook on "The Manufacture of Sulphuric Acid", Reinhold 1959 pp. 171-176 and even in the recent U.S. Pat. Nos. 3,789,019 (issued Jan. 29, 1974) and 3,987,153 (issued Oct. 19, 1976) by A. B. Stiles.

There is considerable ambiguity concerning the role of Cs in the catalytic material. Stiles (U.S. Pat. No. 3,987,153) claims a catalytic activity of $CsVO_3$, a compound that is unlikely to exist in the extremely acidic environment of the catalytic melt. Cs cannot participate in the catalytic process since it is unable to change oxidation stage. Its role is to stabilize a heavily sulfatized vanadium-oxygen complex ion, thereby preventing a gradual formation of inactive $V^4$ species, the existence of which has been proved by ESR (electron spin resonance), IR (infrared absorption), and XRD (X ray diffraction) work.

Even though Examples 2–4 of this application unambiguously prove that a Cs promoted V catalyst is in principle different from a K promoted V catalyst in its low temperature behaviour it is, however, of considerable practical importance to improve the low temperature activity, since the activity of a solely Cs or Cs/K promoted vanadium catalyst—by the general decrease of rate constants with temperature—is significantly lower at 350° C. than at the usual operation temperature 420° C. of the last bed conventional-type catalyst.

It is generally agreed that the rate determining step of the $SO_2$ oxidation process is the reoxidation of a $V^4$-containing ionic complex. It therefore occurred to me that improving the overall rate of absorption of oxygen in the melt would accelerate this catalytic step and thus the overall rate of conversion of $SO_2$. Thus I concluded that it might be possible to improve the activity of the Cs or Cs/K promoted vanadium catalyst for $SO_2$ oxidation by addition of any third component (second promoter) which improves the absorption of oxygen via oxygen ions to the complex $V^{(4)}$-O-S ions that govern the reoxidation step of the catalytic cycle.

The catalyst of the present invention combines the beneficial properties of these two promoter effects to form a catalytic material with a low temperature activity many times higher than those described in the prior art.

SUMMARY OF THE INVENTION

I have found that a highly efficient $SO_2$ oxidation catalyst which retains its activity also in the temperature interval 420° C. to 300° C. where available commercial catalysts fail to give any appreciable conversion, can be prepared with vanadium as the active material and a first promoter comprising cesium, optionally in combination with another alkali metal, such as sodium, potassium and rubidium, known to promote vanadium catalysts.

I have also found that a major increase of activity over this basic catalyst is obtained over the whole temperature range 500° C. to 300° C. when a second promoter selected from the group of metals the oxides of which have a heat of formation greater than 100 kcal per oxygen atom and are at least partly soluble in the heavily sulfatized environment of the melt, is added to the catalyst. Examples of such metals are aluminum, magnesium, yttrium and lanthanum.

In conclusion two types of promoters are required to ensure a high activity of a vanadium based $SO_2$ oxidation catalyst at low temperature: (1) $Cs^+$ to stabilize the active vanadium species at low temperature; (2) $Al^{+++}$ or similar metal ions with very stable oxides which must be soluble in the melt.

Accordingly, the catalytic material according to the invention comprises a catalyst whose active components are molten at reaction temperature and includes (1) sulfatized vanadium ions as the catalytically active component;

(2) a first promoter comprising ions of at least one alkali metal said one alkali metal being cesium to stabilize the active vanadium species at temperatures below 420° C.; and (3) a second promoter comprising ions of at least one metal which does not promote formation of inactive $V^4$ species and the oxide of which has a heat of formation greater than 100 kcal per oxygen atom and is at least partly soluble in the heavily sulfatized environment of the melt to increase the activity of the catalyst at any temperature; said catalyst being dispersed in an inert porous carrier.

In general the first promoter must be present in an atomic ratio of alkali metal to vanadium of at least about 2:1 and the achievement of increased low temperature activity compared to conventional $SO_2$ oxidation catalysts demands the presence of more than 1 atom Cs per atom V. Additional dilution of the vanadium by cesium or by other alkali metals up to a total alkali metal to vanadium ratio of about 6:1 usually has no detrimental effect on the activity per atom vanadium and may, in some cases, have beneficial effects.

To achieve an appreciable increase of catalyst activity the second promoter must be present in an atomic ratio relative to vanadium of at least about 0.2:1, and it may be present in a ratio of up to 1.5:1 or more without any detrimental effect on the activity. The optimum content in the case of Al seems to be about 0.5 atom per atom vanadium.

In addition to the essential components described above the catalytic material of the invention may also include conventional additions for viscosity control or the provision of other desirable properties.

The primary catalyst comprising vanadium and two different promoters is supported by an inert porous carrier such as an inactive silica support, e.g. diatomaceous earth, silica gel or porous glass powder.

The catalytic material according to the invention may be prepared in the conventional way for vanadium catalysts such as by impregnation of the carrier with a solution of a vanadium compound and promoters or by coprecipitation of a vanadium compound and promoters with the carrier followed by any suitable pellet preparation technique such as extrusion, drying and activation either on site or prior to use in a converter, in both cases by treatment with $SO_2/SO_3/O_2$-containing gas at a temperature above 400° C., for example at 420° to 480° C. for 2-6 hours. The impregnation of the carrier with a solution of the active catalytic components may also be made on preformed shapes of carrier material followed by drying and activation as described above.

Accordingly one process of preparing a catalytic material of the invention comprises (a) preparing a solution of a suitable vanadium compound a cesium salt, and a salt of a metal which does not promote formation of inactive $V^4$ species and the oxide of which has a heat of formation greater than 100 kcal per oxygen atom and is at least partly soluble in a melt of sulfatized vanadium, in a suitable solvent;

(b) impregnating a suitable porous carrier with said solution;

(c) forming said impregnated carrier into pellets;

(d) drying said pellets; and (e) subjecting the dried pellets to a stream of air containing an oxide of sulfur selected from the group consisting of $SO_2$ and $SO_3$ at a temperature above 400° C. to activate the catalytic material.

Another process of preparing a catalytic material of the invention comprises (a) preparing a solution of a suitable vanadium compound, a cesium salt, a salt of a metal which does not promote formation of inactive $V^4$ species and the oxide of which has a heat of formation greater than 100 kcal per oxygen atom and is at least partly soluble in a melt of sulfatized vanadium, and a suitable salt of silicic acid in a suitable solvent;

(b) precipitating the silicic material;

(c) forming said precipitated material into pellets;

(d) drying said pellets; and (e) subjecting the dried pellets to a stream of air containing an oxide of sulfur selected from the group consisting of $SO_2$ and $SO_3$ at a temperature above 400° C. to activate the catalytic material.

In the above solutions the suitable vanadium compound may be, for example, vanadyl sulfate, ammonium or alkali metal vanadate. Besides the cesium salt the solutions may include a salt of another alkali metal selected from the group consisting of Na, K and Rb. Suitable alkali metal salts are virtually any inorganic salts, for example, the sulfates, carbonates, phosphates, hydroxides, nitrites and nitrates. The metal with a high heat of formation for oxides is preferably aluminum, magnesium, yttrium or lanthanum. Suitable salts of these metals are virtually any inorganic salts, for example, the sulfates, phosphates, carbonates, hydroxides, nitrites or nitrates that are soluble in the chosen solvent.

The inclusion of phosphate may be advantageous in that it modifies surface tension of the molten salts to provide better spreading and wetting characteristics of the melt But as there is a tendency for $P_2O_5$ to vaporize from the strongly acidic melt at the high temperatures of reaction, the included amount of phosphate should preferably be kept below about 0.5 mole per mole of vanadium.

To the above solutions may also be added conventional additives for viscosity control or the provision of other desirable properties in vanadium catalysts.

Whereas the major invention is concerned with the formulation of a catalyst in accordance with the two principles described above (i.e. low temperature stability using Cs as a first promoter and a generally higher oxygen captivity using Al or similar metals as a second promoter) the properties of the carrier will, of course, affect the activity of the catalytic material. The carrier may be pretreated, e.g. by acid washing, to increase its wetting properties for the melt, and its pore structure should preferably include a wide range of pore sizes from micropores of 2-3 nm up to large pores of 400-600 nm, since a material of this nature has been shown in the above cited review by Villadsen and Livbjerg to exhibit the largest possible spreading effect on the melt, thus avoiding formation of clusters of melt in the pore structure that would decrease the turn-over frequency (rate per atom vanadium) of the catalytic material.

DETAILED DESCRIPTION OF THE INVENTION AND METHODS OF ANALYSIS

Since the cesium promoter effect has often been claimed without experimental evidence in the range of conversion of $SO_2$ above 90% where the need for a new catalyst with satisfactory low-temperature activity clearly justifies the higher unit cost for the catalyst, it has been deemed necessary to devote substantial experimental efforts on measuring rates at conversions higher than 90% in order to prove clearly the superiority of the catalyst described in this invention.

500 activity experiments have been performed with Cs/V ratios from 1.5:1 to 6:1 and also with an additional promoter, e.g. Al, in ratios of 0.5:1 to 1.5:1 relative to vanadium. Only a few typical results will be described in the following examples.

Since the invention is concerned with catalyst composition rather than with choice of carrier, a standard porous glass powder with 200 or 300 nm pore size (±5%) has been used as the carrier throughout the experiments. In this way each change of catalyst composition has been studied without influence from a possible change in carrier properties. For obvious reasons of economy a cheaper carrier, e.g. the diatomaceous earth mentioned in the previous section should, of course, be used commercially.

Most of the experiments have been carried out in a standard type external recirculation reactor operated at approximately atmospheric pressure, but numerous supplementary tests in a screening reactor of the differential type have further substantiated the invention.

In each reactor type the gas could be preconverted to any desirable degree of conversion x of $SO_2$ up to 90-94%, thus enabling the study of even 99% converted gas to be carried out with catalyst samples as small as 2-4 g and a gas flow rate of 150 standard cc per minute.

Analysis of gases was performed by IR absorption, the apparatus being regularly checked by wet chemical analysis of the reactor inlet gas, the preconverted or the finally converted gas mixture.

The data were correlated statistically using the following conversion rate model as a measure of catalytic activity at a given temperature T:

$$-R\left(\frac{\text{g mole } SO_2 \text{ converted}}{\text{atom V} \cdot \text{sec}}\right) = K(P_{SO_2})_o(1-x)(1-\beta^2) \quad (1)$$

where $(p_{SO_2})_o$ is the inlet gas $SO_2$ partial pressure (atm)
x: degree of conversion of $SO_2$ $$\beta \text{ a mass action ratio} = \left(\frac{P_{SO_3}}{P_{O_2}^{\frac{1}{2}} P_{SO_2}}\right) \cdot \frac{1}{K_p}$$

$K_p$: thermodynamic equilibrium constant for

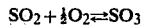

$$SO_2 + \tfrac{1}{2}O_2 \rightleftharpoons SO_3$$

k: is an Arrhenius rate constant of the form $k = a \exp(-E/R_g T)$ where a is dependent on $p_{O_2}$, but substantially constant for $x > 0.90$ and an inlet gas with approximately 3 times the stoichiometric oxygen content (e.g. 8% $SO_2$ and 12% $O_2$ by mole).

The remarkably simple rate law (1) was found to hold true at least in the conversion range 45% to 99%, and it has proved very useful for an objective comparison of different catalyst compositions.

The most significant difference between a Cs promoted catalyst and a catalyst with an identical K/V ratio and with the same amount of vanadium per g carrier is that while the Arrhenius plots for k of formula (1) showed an essentially constant activation energy in the temperature range 478° to less than 350° C. with the Cs promoted catalyst, a similar plot for the K promoted catalyst exhibits a marked break in the Arrhenius plot at 440°-420° C. leading to an order of magnitude difference in the rate constant at 350° C. between the Cs and the K promoted catalyst. At high temperatures the difference between the two promoters is not so marked, the Cs promoted catalyst being 15-20% more active at 478° C.

By a similar analysis it was proved that addition of as little as 0.5 atom Al (or another oxygen acceptor) per atom V leads to a 50% increase in activity from 478° C. to 350° C. as compared with a Cs promoted catalyst without this second promoter.

EXAMPLE 1

1.31 g $K_2SO_4$ and 1.277 g $VOSO_4.5.1H_2O$ are dissolved in distilled water to make 15 cc solution. This solution is poured onto 9.54 g of a 40-60 mesh CPG (controlled pore glass) sample of pore diameter 307 nm±5% and with pore volume 0.96 cc/g.

After imbibition for 10 minutes some solution is decanted off the powder and the remainder is centrifuged off for 15 minutes at 2000 rev/min.

The sample is dried at 120° C. for 20 hours and approximately 1 g is used for a standard vanadium wet chemical analysis.

The chemical analysis of the air dried sample shows that the pore volume is just filled by the imbibition technique with apparently very efficient separation of solid phase from liquid in the interstices of the catalyst layer by the proposed centrifugation process.

The dried but unactivated sample contains 5.23 wt % $VOSO_4$ based on dry support and the K/V atomic ratio is 3:1. It is denoted by the letter A in Table 1.

5.6 grams of the dried sample are used for activity measurements in the recirculation reactor described above followed by an in situ activation whereby 150 cc/min of an 89.2% converted mixture of 7.76 vol % $SO_2$, 12.24 vol % $O_2$, 80.0 vol % $N_2$ is passed through the catalyst for 4 hours at 478° C.

After 4 hours activity measurements were started using the same inlet gas composition and various degrees of preconversion to obtain the rate at different conversions in the range 90-98% and at a set of temperatures ranging from 478° C. to 390° C. The rate $-R$ at the outlet conditions of the recirculation reactor is calculated by the formula $$-R = F_o \Delta x / W \quad (2)$$

Δx is the change of conversion from preconverter to outlet of recirculation reactor measured both by IR analysis and by wet chemical analysis, titrating a given gas volume with iodine-thiosulfate. $F_o$ is the constant molar flowrate of $SO_2$ to the reactor (150 standard cc/min containing 7.76% $SO_2$), and W is the weight of catalyst (5.6 g in series A).

Finally the value of k is calculated by formula (1) and shown in the first line of Table 1 for different values of reaction temperature.

The same catalyst preparation technique was used in each of the following experiments (series B, C, and D) and in Example 2, 3, and 4. Also the same method of analysis of the data was used in subsequent experiments. The rate of recirculation in the laboratory reactor was at least 25 to 1 and the behavior of the reactor is thus practically the same as an ideal continuous stirred tank reactor, allowing the rate to be calculated by formula (2) with full confidence.

In series B and C samples with K/V atomic ratio 3.5:1 and respectively 5.0 and 13.7 weight % $VOSO_4$ on 307 nm porous glass was tested. In series D a sample with K/V ratio 3:1 and 22.6 weight % $VOSO_4$ on a 250 nm porous glass with pore volume 1.44 cc/g was tested.

The degree of utilization of the catalyst (rate per atom V) decreases with increasing $VOSO_4$ content of the catalyst due to cluster formation. This phenomenon is seen in all experiments—also with the Cs or Cs/Al containing vanadium catalysts. It is ascribed to the physical structure of the support and is of no consequence to the comparison of catalysts of different chemical composition. In our experiments a well defined pore structure (uniform pore size glass powder) was used. Commercially available supports such as diatomaceous earth will disperse the catalytic melt better and consequently increase the utilization of vanadium.

The important conclusion from Table 1 is that none of the K promoted catalysts are active below 390° C. Prolonged operation of the 22.6 weight % $VOSO_4$ sample D caused a gradual decrease of activity at 400° C. and the activity vs. temperature diagram exhibits a marked hysteresis.

Table 1:

| | Activity of K promoted vanadium catalysts | | | | | |
|---|---|---|---|---|---|---|
| | g $VOSO_4$/g | k g-n $SO_2$/(g-n V) sec atm. | | | | |
| | K/V | Support | 478 | 440 | 420 | 400 | 380 |
| Sample A | 3 | 5.23 | 0.25 | 0.15 | 0.11 | 0.06 | 0.01 |
| Sample B | 3.5 | 5.0 | 0.24 | 0.17 | 0.12 | 0.06 | 0.02 |
| Sample C | 3.5 | 13.7 | 0.19 | 0.16 | 0.06 | 0.03 | ~0 |
| Sample D | 3 | 22.6 | 0.12 | 0.09 | 0.03 | ~ | 0 |

EXAMPLE 2

A catalyst sample with 5.21 wt % $VOSO_4$ and a Cs/V atomic ratio of 3.5:1 was prepared from $Cs_2SO_4$ and $VOSO_4.5.1H_2O$ using the method described in Example 1. The activity of this catalyst, measured in terms of the value of k by formula (1) is shown in Table 2, first line for various temperatures in the range 478° C. to 352° C.

The activity of another sample with 13.13% $VOSO_4$, but also with Cs/V=3.5:1 is shown in line 2 of Table 2.

EXAMPLE 3

A catalyst sample with 5.50 wt % $VOSO_4$ and with Cs/V=3:1 is prepared and tested as described in Example 1. Its activity at various temperatures, measured in terms of k by formula (1) is shown in line 3 of Table 1.

There appears to be no substantial difference between the results of Example 3 and Example 2. Consequently the concentration of the active component in the same amount of liquid catalyst can be increased by using a lower dilution with Cs.

EXAMPLE 4

A catalyst sample with 5.4 wt % $VOSO_4$ and atomic ratio Cs/V/Al=3:1:0.5 was prepared almost as in Example 1. Since $CsAl(SO_4)_2$ is only slightly soluble in water at room temperature the impregnation of the support with solution was performed at 90° C. followed by centrifugation with previously heated glass holders in the centrifuge.

Table 2

| | Activity of Cs and double promoted vanadium catalysts | | | | | | | | |
|---|---|---|---|---|---|---|---|---|---|
| | Cs/V | Second promotor | g $VOSO_4$/ 100 g support | K g-n $SO_2$/ (g-n V)sec atm. | | | | | |
| | | | | 478 | 440 | 420 | 400 | 380 | 352 |
| Example 2 | 3.5 | — | 5.21 | 0.45 | 0.24 | 0.16 | 0.11 | 0.07 | 0.03 |
| | 3.5 | — | 13.13 | 0.28 | 0.19 | 0.13 | 0.09 | 0.05 | 0.02 |
| Example 3 | 3 | — | 5.50 | 0.40 | 0.28 | 0.18 | 0.11 | 0.06 | 0.03 |
| Example 4 | 3 | 0.5 Al | 5.40 | 0.60 | 0.37 | 0.25 | 0.15 | 0.09 | 0.05 |

Comparison of the results of Table 1 and 2 shows that the new catalyst is active and stable at a temperature at least 70° C. lower than is a K promoted catalyst. The second promoter has the specific effect of increasing the activity of the Cs promoted vanadium by a factor 1.5 for all temperatures, without otherwise changing the stabilizing properties of the Cs-promoter.

The rate of the catalyst promoted by Cs alone is 5–7 times as high as that of the K promoted catalyst at 380° C., and addition of as little as 0.5 mole Al to the Cs promoted catalyst increases the activity by another factor of 1.5.

The Arrhenius plot (i.e. log k vs 1/T) is virtually a straight line for the Cs or Cs/Al promoted catalysts from 478° C. to the melting point of the catalytic melt at approximately 310°–325° C. This is a fundamental difference between the new catalyst and previously used sulfur dioxide oxidation catalysts.

I claim:

1. A catalytic material for the oxidation of sulfur dioxide to sulfur trioxide at any temperature above 300° C. which comprises a catalyst whose active components are molten at reaction temperature and includes
    (1) sulfatized vanadium ions as the catalytically active component;
    (2) a first promoter comprising ions of at least one alkali metal said one alkali metal being cesium to stabilize the active vanadium species at temperatures below 420° C.; and
    (3) a second promoter comprising ions of at least one metal which does not promote formation of inactive $V^4$ species and the oxide of which has a heat of formation greater than 100 kcal per oxygen atom and is at least partly soluble in the heavily sulfatized environment of the melt to increase the activity of the catalyst at any temperature;
said catalyst being supported by an inert porous carrier.

2. A catalytic material according to claim 1 wherein said first promoter comprises cesium ions.

3. A catalytic material according to claim 1, wherein said first promoter comprises ions of cesium and another alkali metal selected from the group consisting of Na, K and Rb.

4. A catalytic material according to claim 1 wherein said second promoter comprises ions of a metal selected from the group consisting of Al, Mg, Y and La.

5. A catalytic material according to claim 1 wherein the first promoter is present in an atomic ratio of alkali metal to vanadium of from about 2:1 to about 6:1 the atomic ratio of cesium to vanadium being more than 1:1.

6. A catalytic material according to claim 1 wherein the second promoter is present in an atomic ratio relative to vanadium of from about 0.2:1 to about 1.5:1.

7. A catalytic material according to claim 1 wherein the second promoter is Al which is present in a ratio of about 0.5 atoms per atom V.

8. A catalytic material according to claim 1 wherein said carrier is an inactive silica support.

9. A catalytic material according to claim 8 wherein the carrier is selected from the group consisting of diatomaceous earth, silica gel and porous glass powder.

10. A process of preparing a catalytic material for the oxidation of sulfur dioxide to sulfur trioxide which comprises
    (a) preparing a solution of a suitable vanadium compound, a cesium salt, and a salt of a metal which does not promote formation of inactive $V^4$ species and the oxide of which has a heat of formation greater than 100 kcal per oxygen atom and is at least partly soluble in a melt of sulfatized vanadium, in a suitable solvent;
    (b) impregnating a suitable porous carrier with said solution;
    (c) forming said impregnated carrier into pellets;
    (d) drying said pellets; and
    (e) subjecting the dried pellets to a stream of air containing an oxide of sulfur selected from the group consisting of $SO_2$ and $SO_3$ at a temperature above 400° C. to activate the catalytic material.

11. A process according to claim 10 wherein said vanadium compound is selected from the group consisting of vanadyl sulfate, ammonium vanadate and alkali metal vanadates.

12. A process according to claim 10 wherein said cesium salt is selected from the group comprising the sulfate, carbonate, phosphate, hydroxide, nitrite and nitrate.

13. A process according to claim 10 wherein a salt of another alkali metal selected from the group consisting of Na, K and Rb is also included in the starting solution.

14. A process according to claim 13 wherein said alkali metal salt is selected from the group consisting of sulfates, carbonates, phosphates, hydroxides, nitrites and nitrates.

15. A process according to claim 10 wherein said salt of a metal which does not promote formation of inactive $V^4$ species and the oxide of which has a heat of formation greater than 100 kcal per oxygen atom and is at least partly soluble in a melt of sulfatized vanadium is selected from the group consisting of the sulfates, phosphates, carbonates, hydroxides, nitrites and nitrates of Al, Mg, Y and La.

16. A process according to claim 10 wherein at least one of the salts included in the starting solution is phosphate in an amount below 0.5 mole per mole of vanadium.

17. A process according to claim 10 wherein said carrier is an inactive silica support.

18. A process according to claim 17 wherein the carrier is selected from the group consisting of diatomaceous earth, silica gel and porous glass powder.

19. A process of preparing a catalytic material for the oxidation of sulfur dioxide to sulfur trioxide which comprises
    (a) preparing a solution of a suitable vanadium compound, a cesium salt, a salt of a metal which does not promote formation of inactive $V^4$ species and the oxide of which has a heat of formation greater than 100 kcal per oxygen atom and is at least partly soluble in a melt of sulfatized vanadium, and a suitable salt of silicic acid in a suitable solvent;
    (b) precipitating the silicic meterial;
    (c) forming said precipitated material into pellets;
    (d) drying said pellets; and
    (e) subjecting the dried pellets to a stream of air containing an oxide of sulfur selected from the group consisting of $SO_2$ and $SO_3$ at a temperature above 400° C. to activate the catalytic material.

20. A process according to claim 19 wherein said vanadium compound is selected from the group consisting of vanadyl sulfate, ammonium vanadate and alkali metal vanadates.

21. A process according to claim 19 wherein said cesium salt is selected from the group comprising the sulfate, carbonate, phosphate, hydroxide, nitrite and nitrate.

22. A process according to claim 19 wherein a salt of another alkali metal selected from the group consisting of Na, K and Rb is also included in the starting solution.

23. A process according to claim 22 wherein said alkali metal salt is selected from the group consisting of sulfates, carbonates, phosphates, hydroxides, nitrites and nitrates.

24. A process according to claim 19 wherein said salt of a metal which does not promote formation of inactive $V^4$ species and the oxide of which has a heat of formation greater than 100 kcal per oxygen atom and is at least partly soluble in a melt of sulfatized vanadium is selected from the group consisting of the sulfates, phosphates, carbonates, hydroxides, nitrites and nitrates of Al, Mg, Y and La.

25. A process according to claim 19 wherein at least one of the salts included in the starting solution is phosphate in an amount below 0.5 mole per mole of vanadium.

* * * * *

UNITED STATES PATENT OFFICE
CERTIFICATE OF CORRECTION

Patent No. 4,193,894         Dated March 18, 1980

Inventor(s) John Villadsen

It is certified that error appears in the above-identified patent and that said Letters Patent are hereby corrected as shown below:

On the front page of the patent in bracketed item 75, the inventor's address "Vedbek, Denmark" should read -- Vedbæk, Denmark -- .

IN THE SPECIFICATION:

In column 5, in the equation following line 53, please delete "K" and substitute -- k -- therefor.

Signed and Sealed this

Twenty-ninth Day of July 1980

[SEAL]

Attest:

SIDNEY A. DIAMOND

Attesting Officer         Commissioner of Patents and Trademarks